(12) United States Patent
Ba et al.

(10) Patent No.: US 12,220,723 B2
(45) Date of Patent: Feb. 11, 2025

(54) METHOD FOR PRODUCING, APPLYING AND FIXING A MULTILAYER SURFACE COATING ON A HOST SUBSTRATE, AND HOST SUBSTRATE ASSEMBLY WHICH CAN BE OBTAINED BY SAID METHOD

(71) Applicants: BLACKLEAF, Strasbourg (FR); Centre National de la Recherche Scientifique, Paris (FR); Université de Strasbourg, Strasbourg (FR)

(72) Inventors: Housseinou Ba, Strasbourg (FR); Armel Bahouka, Illkirch (FR); Yannick Lafue, Strasbourg (FR); Cuong Pham-Huu, Strasbourg (FR)

(73) Assignees: BLACKLEAF, Strasbourg (FR); CENTRE NATIONAL DE LA RECHERCHE SCIENTIFIQUE, Paris (FR); UNIVERSITÉ DE STRASBOURG, Strasbourg (FR)

( * ) Notice: Subject to any disclaimer, the term of this patent is extended or adjusted under 35 U.S.C. 154(b) by 737 days.

(21) Appl. No.: 17/290,371

(22) PCT Filed: Nov. 27, 2019

(86) PCT No.: PCT/EP2019/082738
§ 371 (c)(1),
(2) Date: Apr. 30, 2021

(87) PCT Pub. No.: WO2020/109380
PCT Pub. Date: Jun. 4, 2020

(65) Prior Publication Data
US 2021/0402429 A1    Dec. 30, 2021

(30) Foreign Application Priority Data
Nov. 27, 2018    (FR) ...................................... 1871908

(51) Int. Cl.
*B05D 1/36* (2006.01)
*B05D 7/00* (2006.01)
(Continued)

(52) U.S. Cl.
CPC ................. *B05D 1/36* (2013.01); *B05D 7/52* (2013.01); *H05B 3/145* (2013.01); *H05B 3/26* (2013.01);
(Continued)

(58) Field of Classification Search
None
See application file for complete search history.

(56) References Cited

U.S. PATENT DOCUMENTS

| 5,683,747 A | 11/1997 | Hamon |
| 2014/0021195 A1 | 1/2014 | Kim |

(Continued)

FOREIGN PATENT DOCUMENTS

| CN | 106967335 A | * | 7/2017 | ............. C09D 11/03 |
| DE | 102009034307 A1 | | 1/2011 | |

(Continued)

OTHER PUBLICATIONS

JP 2015-059079 A (Yamada, Masahiro et al.) Mar. 30, 2015 [retrieved on Apr. 15, 2024]. Retrieved from Foreign Image and Text database, translation by Clarivate Analytics. (Year: 2015).*

(Continued)

*Primary Examiner* — John J Norton
(74) *Attorney, Agent, or Firm* — CANTOR COLBURN LLP

(57) ABSTRACT

The invention relates to a method for producing, applying and fixing a multilayer surface coating (2a, 3a) on at least one surface (1a) to be coated of a host substrate (1) in order to produce a host substrate assembly. Starting with a fixative product (2) and a functional product (3) based on single- (Continued)

Figure 1:
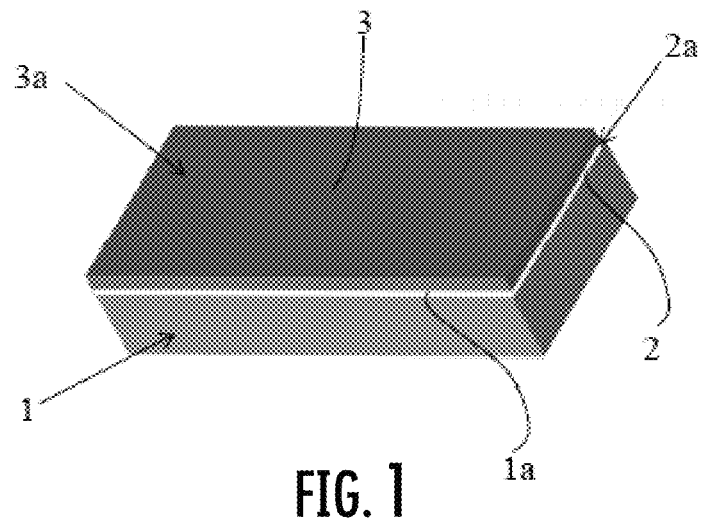

walled or multi-walled graphene, the method consists in successively applying: a layer (2a) of fixative product to the or to each surface (1a) to be coated of the host substrate (1); and a layer of the functional product to said fixative layer (2a). The assembly can be finished with a protective layer deposited directly onto the layer (3a) that contains the functional product. The invention also relates to a host substrate assembly which can be obtained by said method, a heating element, an anti-corrosion and/or anti-fouling/dirt-repelling element and a hydrophobic element each comprising such an assembly.

17 Claims, 14 Drawing Sheets

(51) Int. Cl.
  *H05B 3/14* (2006.01)
  *H05B 3/26* (2006.01)
(52) U.S. Cl.
  CPC .. *H05B 2203/013* (2013.01); *H05B 2203/017* (2013.01)

(56) References Cited

U.S. PATENT DOCUMENTS

| | | | | |
|---|---|---|---|---|
| 2015/0064451 | A1* | 3/2015 | Kalaga | C01B 32/186 562/512 |
| 2016/0245772 | A1* | 8/2016 | Anderson | B05D 3/065 |
| 2019/0184940 | A1* | 6/2019 | Moon | H05B 3/16 |
| 2019/0212476 | A1* | 7/2019 | Jin | G02B 1/18 |

FOREIGN PATENT DOCUMENTS

| | | |
|---|---|---|
| EP | 2716981 A1 | 4/2014 |
| EP | 3106762 A1 | 12/2016 |
| FR | 3013052 A1 | 5/2015 |
| GB | 2535499 A | 8/2016 |
| JP | 2015059079 A | 3/2015 |
| WO | 2014073402 A1 | 5/2014 |
| WO | 2014091161 A1 | 6/2014 |
| WO | 2016126827 A1 | 8/2016 |
| WO | WO-2016132125 A1 * 8/2016 ............ C09D 11/52 |
| WO | WO-2019236107 A1 * 12/2019 |

OTHER PUBLICATIONS

CN 106967335 A (Li, Qing et al.) Jul. 21, 2017 [retrieved on Apr. 15, 2024]. Retrieved from Foreign Image and Text database, translation by Clarivate Analytics. (Year: 2017).*

International Search Report for corresponding application PCT/EP2019/082738 filed Nov. 27, 2019; Mail date Apr. 15, 2020.

* cited by examiner

METHOD FOR PRODUCING, APPLYING AND FIXING A MULTILAYER SURFACE COATING ON A HOST SUBSTRATE, AND HOST SUBSTRATE ASSEMBLY WHICH CAN BE OBTAINED BY SAID METHOD

The present invention relates to the field of surface coatings and has as its object a process for producing, applying and fixing a multilayer surface coating to at least one surface to be coated of a host substrate. It also has as its object, in particular, a host substrate device obtained by said process. It also has as its object a heating element comprising such a host substrate device, an anticorrosion element comprising such a device and a hydrophobic element comprising such a device.

Two-dimensional (2D) materials, such as monolayer or multilayer graphene, and carbonaceous materials, such as carbon nanotubes and carbon nanofibers, have excellent optical, electronic, mechanical and thermal properties, as well as excellent, even extraordinary, flexibility and gas and liquid barrier properties, more particularly for graphene and its derivatives. These properties have in recent years opened the door to a number of potential applications, particularly in the fields of electronics and semiconductors, heating, corrosion or biofouling control, improvement of tribological or mechanical properties, filtration or other protective barriers, optics, light or energy. These materials thus represent a considerable potential in many applications.

In the field of heating, heating paints incorporating such materials have been developed. The document WO2014/091161 relates to a heating paint comprising graphite and intended to be deposited, in the form of at least one layer of paint, on a host substrate in order to apply to it, by means of two electrodes, an electrical voltage so as to obtain an increase in temperature. Graphene-based heating paints are also known, such as that made by the manufacturer Graphenstone™. Such paints improve the thermal regulation of buildings and substantially reduce their energy consumption.

However, this type of paint, or any other product comprising these 2D and/or carbonaceous materials, has the disadvantage of requiring a large quantity of 2D and/or carbonaceous material(s) incorporated in this same paint to achieve percolation ensuring the maintenance of electrical or thermal conduction in the material, which results in products with a relatively high manufacturing cost.

Furthermore, the 2D and/or carbonaceous material, which is embedded in the mass of the product or dispersed in a liquid solution, for example in paint, in a resin or in a semiconductor material, generates a low energy efficiency. This is due to the presence of the insulator (polymer, paint) around the carbonaceous materials which induces conduction losses and requires high concentrations of 2D and/or carbonaceous material(s) to ensure good percolation. The problems of overheating around these junction points between a conductor (2D and/or carbonaceous material(s)) and an insulator (polymer, paint, resin) could also affect the performance of the coating.

The purpose of the present invention is to overcome these disadvantages.

To this end, one object of the present invention is a process for producing, applying and fixing a multilayer surface coating to at least one surface to be coated, whether treated or untreated, of a host substrate, in order to obtain a host substrate device comprising said multilayer surface coating and said host substrate, said process being characterized essentially in that it consists in starting from, on the one hand, a fixing product and, on the other hand, a functional product having a liquid form and comprising monolayer or multilayer graphene dispersed in water or in a hydroalcoholic solution or in a solvent, said fixing product being capable of being applied and fixed directly to the or each surface to be coated, whether treated or untreated, of the host substrate by surface interaction between the latter and said fixing product, said functional product being capable of being applied and fixed directly to the fixing product by surface interaction between the latter and said functional product, to be applied successively:
   a layer of fixing product, called the fixing layer, directly to the or each surface to be coated, whether treated or untreated, of the host substrate by covering the latter, the surface interaction between the latter achieving their fixing to each other,
   a layer, preferably thin, of functional product, called the functional layer, directly to the fixing layer by covering the latter, the surface interaction between the latter achieving their fixing to each other and thus the fixing of the functional layer to the or each surface to be coated of the host substrate via the fixing layer, said functional product being applied to the fixing layer by spraying, projection or spreading,
and, optionally, providing a drying period for the fixing layer, before and/or after the application of the functional layer, to promote the fixing of the fixing layer on the or each surface to be coated of the host substrate and/or the fixing of the functional layer on the fixing layer. The length of the drying period may depend on the nature of the fixing layer in order to ensure strong adhesion between the different materials constituting the final product.

Another object of the present invention is a host substrate device obtainable by the process according to the present invention, said host substrate device comprising a host substrate having at least one surface to be coated, whether treated or untreated, and being essentially characterized in that the host substrate device further comprises a multilayer surface coating capable of being produced, applied and fixed directly to the surface to be coated, the host substrate device further comprises a multilayer surface coating which can be produced, applied and fixed directly to the surface to be coated, whether treated or untreated, according to the process of the present invention, said multilayer surface coating comprising a superposition of a layer of fixing product, called the fixing layer, applied and fixed directly to the or each surface to be coated, whether treated or untreated, and a layer of functional product, called the functional layer, based on monolayer or multilayer graphene, applied and fixed directly to the fixing layer. The functional layer can be applied several times in order to ensure a specific electrical conductivity for the intended application. The functional layer can be protected, in particular from the external environment, by a protective layer applied directly to this functional layer.

A further object of the present invention is a heating element comprising a host substrate device according to the present invention, characterized in that it further comprises an activation system capable of causing, in interaction with monolayer or multilayer graphene, an increase in the temperature of said functional layer and thus of the heating element.

The present invention also has as its object an anticorrosion element comprising a host substrate device according to the present invention, characterized in that the functional product is made from monolayer or multilayer graphene, naturally exhibiting antifouling properties, the surface to be coated of the host substrate then being at least partly metallic and/or the functional product is made from monolayer or multilayer graphene. The surface to be coated of the host substrate can then be intended to be in contact with a medium, for example liquid by being immersed in the latter, or of gas containing particles, having a clogging or fouling power or effect.

A further object of the present invention is a hydrophobic element comprising a host substrate device according to the present invention, characterized in that the functional layer has surface hydrophobic properties. The functional layer may be surface heat-treated or chemically treated to obtain said hydrophobic properties on the outer surface of said functional layer.

Figure 2:
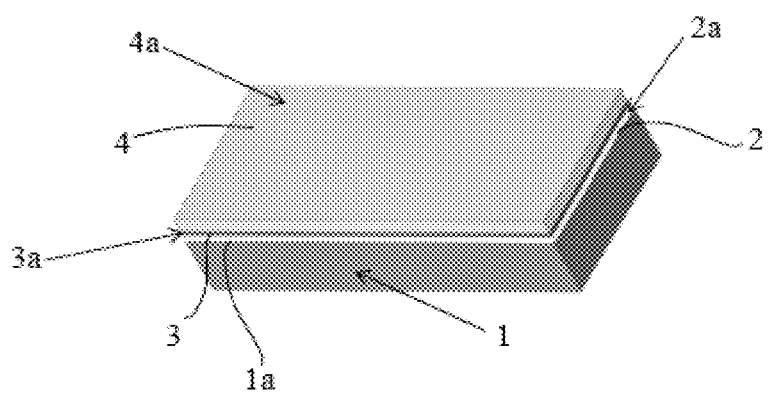
Figure 3A:
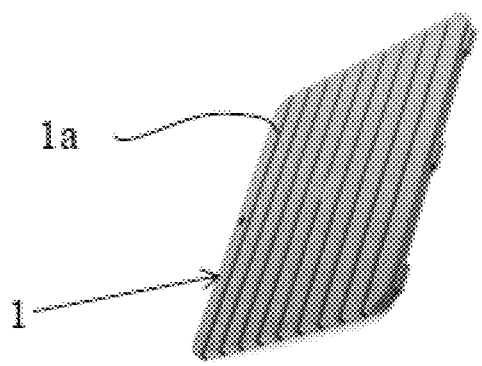
Figure 3B:
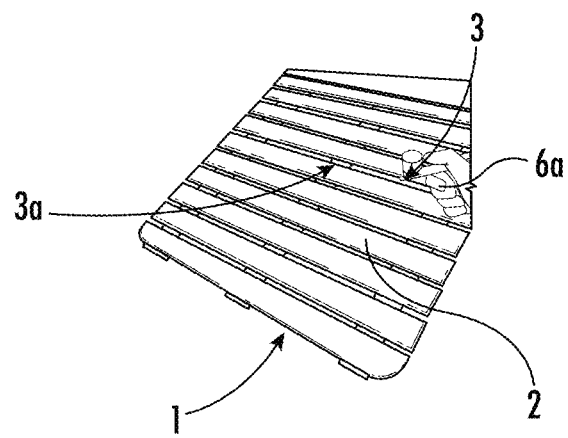
Figure 3C:
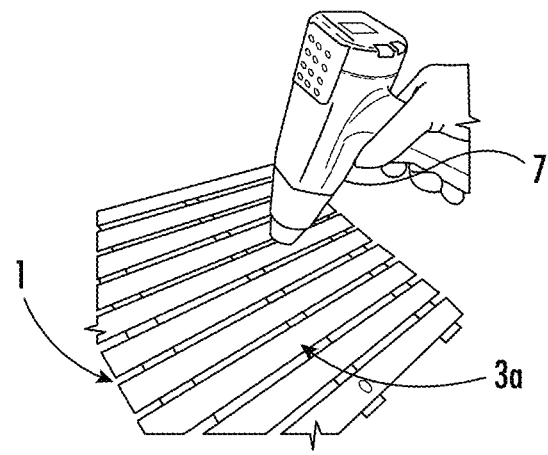
Figure 3D:
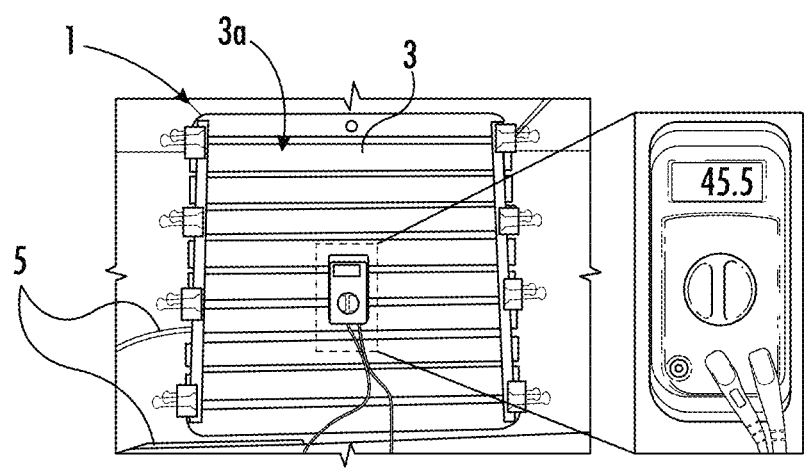
Figure 3E:
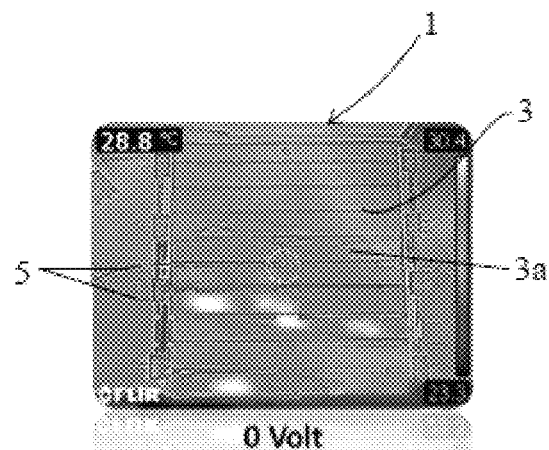
Figure 3F:
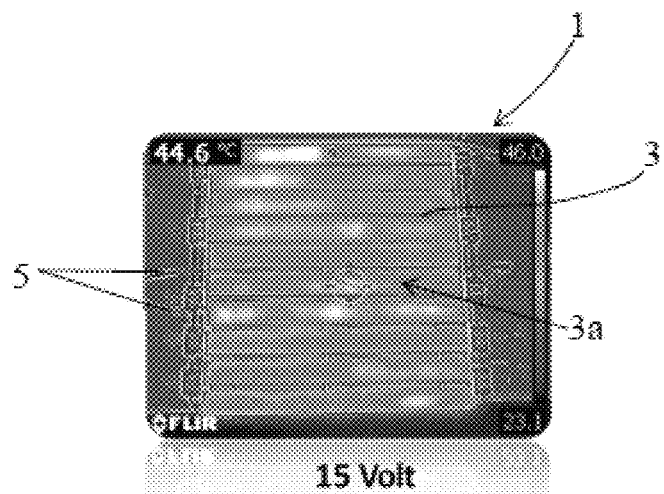
Figure 4A:
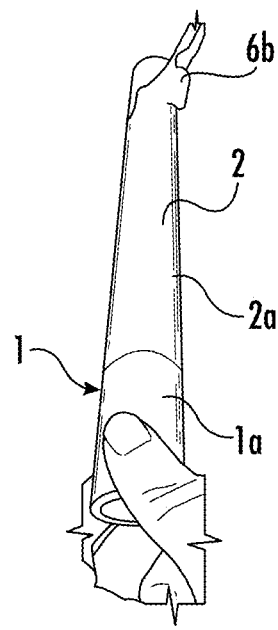
Figure 4B:
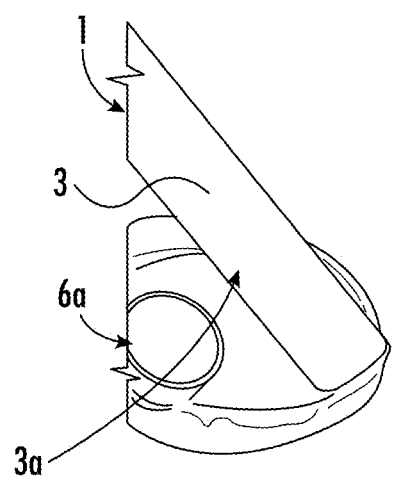
Figure 4C:
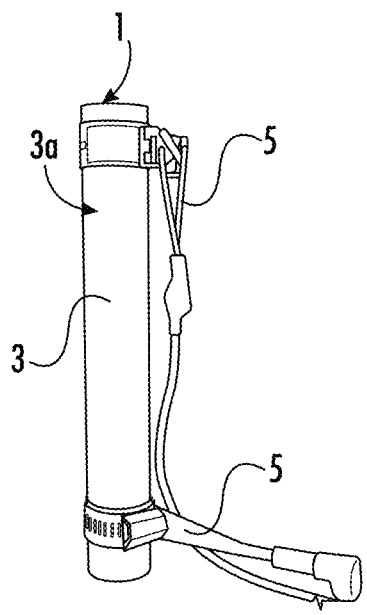
Figure 4D:
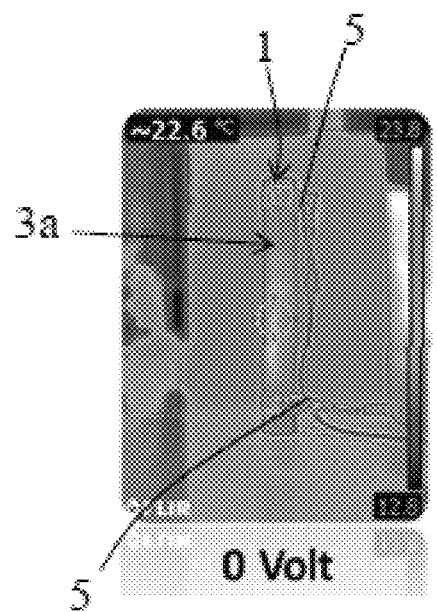
Figure 4E:
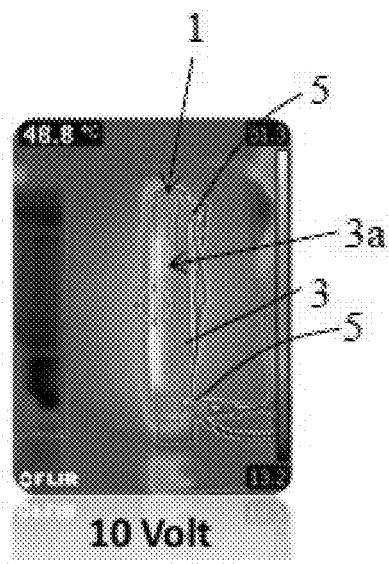
Figure 5A:
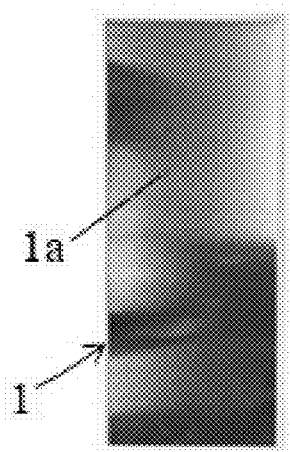
Figure 5B:
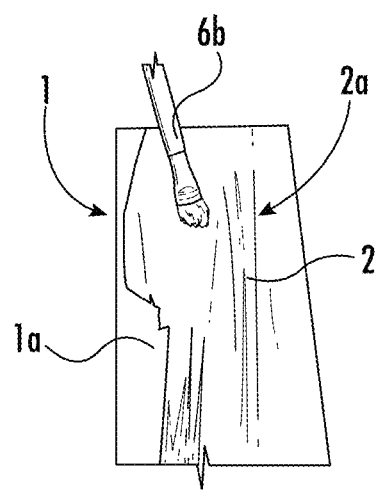
Figure 5C:
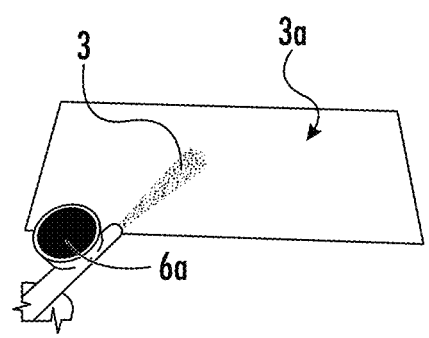
Figure 5D:
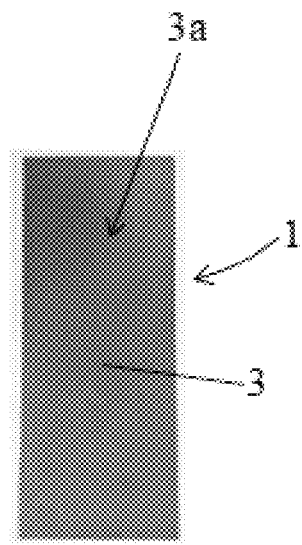
Figure 5E:
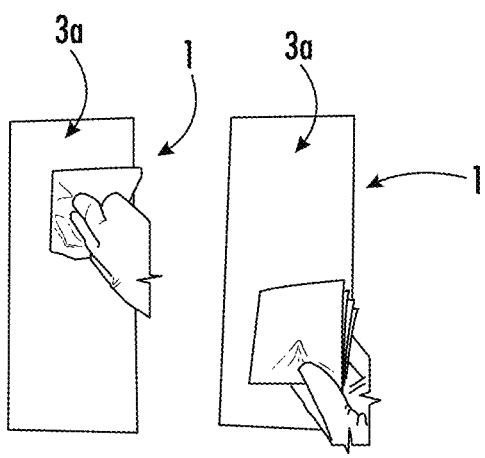
Figure 5F:
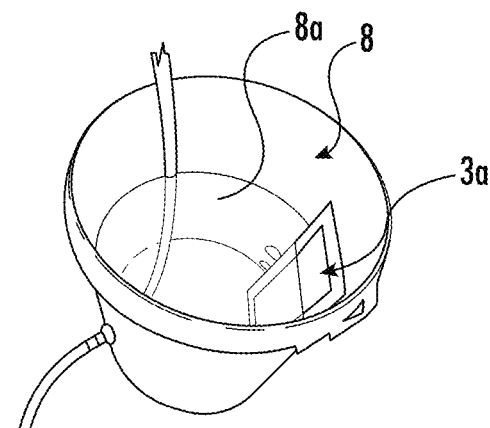
Figure 5G:
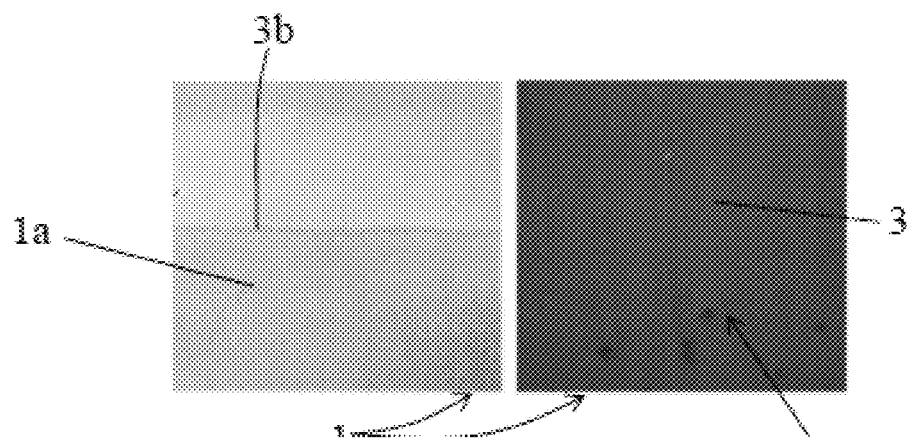
Figure 5H:
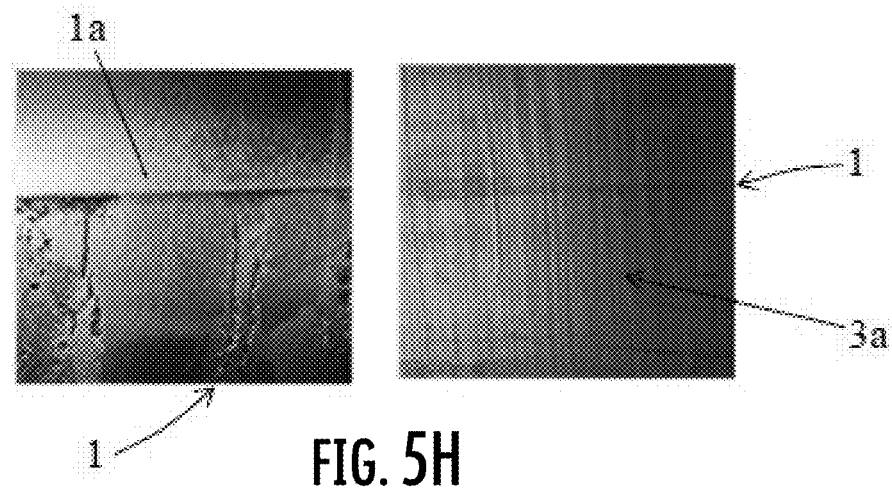
Figure 6A:
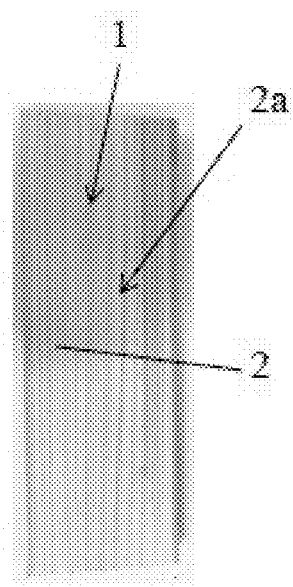
Figure 6B:
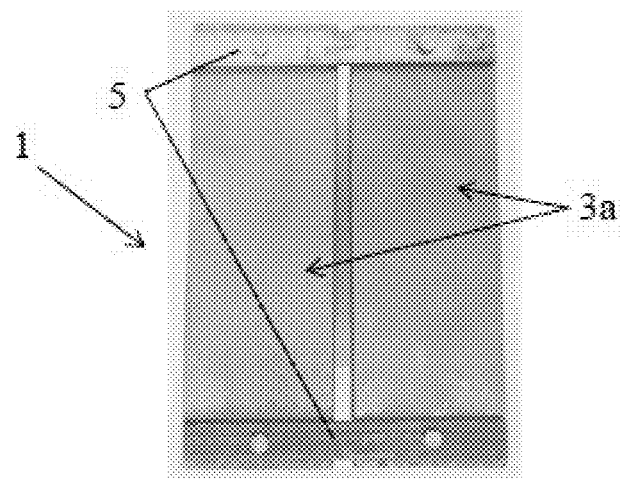
Figure 6C:
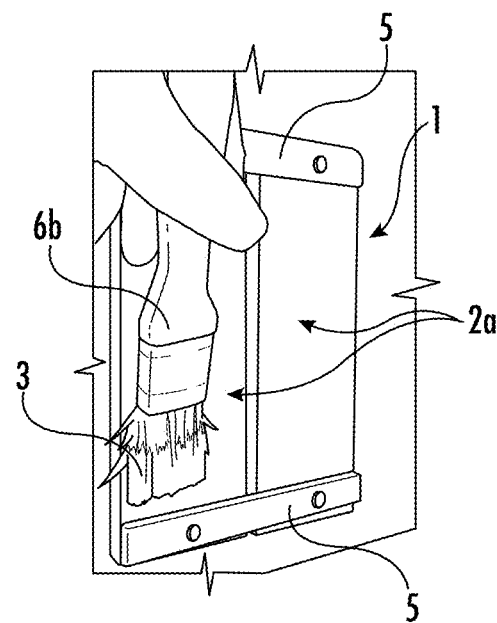
Figure 6D:
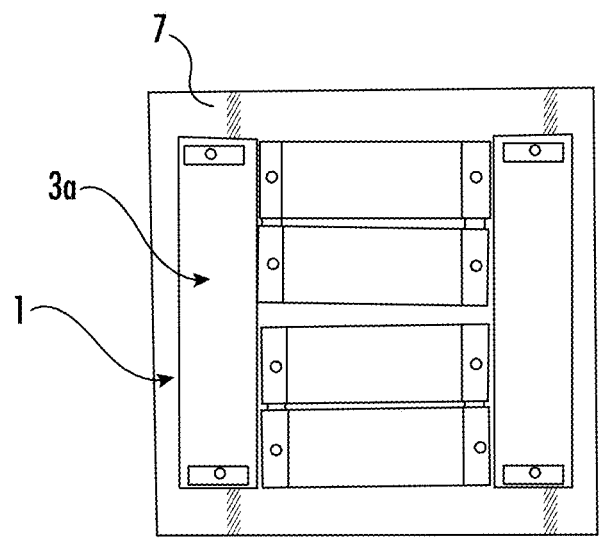
Figure 6E:
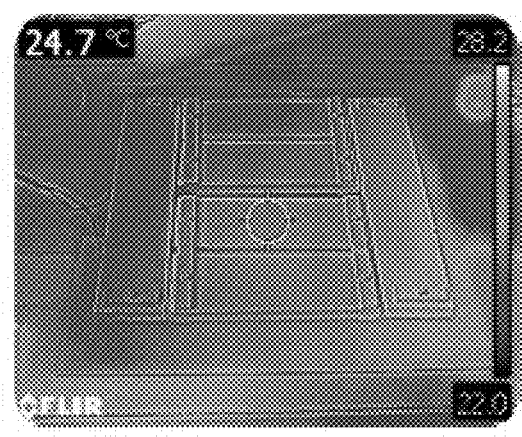
Figure 6F:
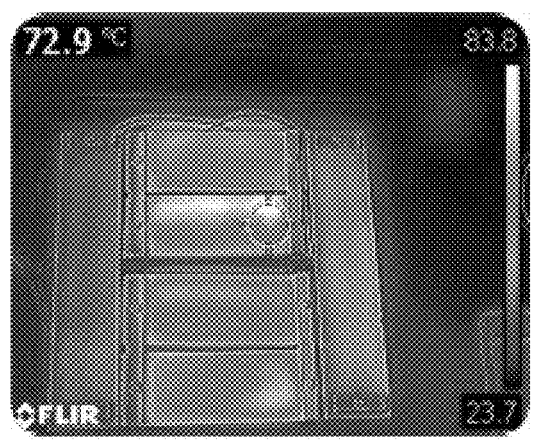

The invention will be better understood, thanks to the following description, which relates to at least one preferred embodiment, given by way of non-limiting example, and explained with reference to the appended schematic drawings, in which:

FIG. 1 is a schematic perspective view of a host substrate device according to the present invention, with the functional layer in the exposed and accessible state, FIG. 2 is a schematic perspective view of the host substrate device shown in FIG. 1, with the functional layer covered by a protective layer, FIG. 3A shows a host substrate consisting of a grating, prior to the application of the fixing layer and the functional layer on a surface to be coated of said host substrate, FIG. 3B shows the surface to be coated of the grating shown in FIG. 3a, covered by the fixing layer, during the phase of spray application or deposition of the functional product on said fixing layer to form the functional layer covering the latter, FIG. 3C shows the drying phase, using a drying apparatus, of the multilayer surface coating applied to the host substrate shown in FIG. 3b to thereby obtain a host substrate device according to the present invention, FIG. 3D shows a heating element, according to the present invention, comprising, on the one hand, the host substrate device obtained during the drying phase shown in FIG. 3c and, on the other hand, copper electrodes placed in electrical contact with the functional layer of the multilayer surface coating, said electrodes being connected to a measuring instrument allowing the measurement of at least one electrical quantity such as a resistance, a voltage or a current, FIG. 3E shows the heating element of FIG. 3d with the indication of the temperature measured at the surface of the functional layer in the case of a zero electrical potential difference between the electrodes, FIG. 3F shows the heating element of FIG. 3d with the indication of the temperature measured at the surface of the functional layer in the case of an electrical potential difference between the electrodes equal to 15 V and a non-zero electrical current resulting in a significant increase in temperature, FIG. 4A shows a host substrate consisting of a PVC tube covered on its outer side by the fixing layer containing a white glycerol paint-based fixing product applied with a brush, FIG. 4B shows the host substrate of FIG. 4a during the step of spray application of the functional product to the fixing layer to form the functional layer covering the latter and thereby obtain a host substrate device according to the present invention, FIG. 4C shows a heating element, according to the present invention, comprising, on the one hand, the host substrate device obtained during the application phase shown in FIG. 4b and, on the other hand, electrodes placed and in electrical contact with the functional layer containing functional product, FIG. 4D shows the heating element of FIG. 4c with the indication of the temperature of the functional layer in the case where no electrical voltage is applied or no electrical current flows through the functional layer, FIG. 4E shows the temperature recorded by an infrared camera on the surface of the functional layer in the case where an electric voltage equal to 10 V is applied between the electrodes in contact with the functional layer, causing an electric current to flow through the latter and increasing its temperature, FIG. 5A shows a host substrate consisting of a metal plate, FIG. 5B shows the host substrate of FIG. 5a during the phase of application, using a brush, of the fixing product to the surface to be coated on one of the two sides of the metal plate in order to form the fixing layer covering said surface, FIG. 5C shows the host substrate with the fixing layer formed during the application phase shown in FIG. 5b, during the phase of spray application of the functional product to said fixing layer to form the functional layer covering the latter and thus the multilayer surface coating formed by the superposition of the fixing layer and the functional layer, FIG. 5D shows the host substrate of FIG. 5c covered by the multilayer surface coating after the phase of drying said multilayer surface coating in an oven thereby forming a host substrate device according to the present invention, FIG. 5E shows an anticorrosion element according to the present invention comprising the obtained substrate device of FIG. 5d thus prepared after heat treatment to remove moisture and to fix the material layers to each other and shows that rubbing the surface with white paper does not leave traces of graphene (functional layer material) on the paper indicating the very good adhesion of the latter to the fixing layer, FIG. 5F shows an anticorrosion element according to the present invention comprising the host substrate device of FIG. 5d, the edges of which have been covered by a protective layer (in white), immersed in a bucket of water continuously supplied with running water, FIG. 5G shows the surface condition, on the one hand, seen on the left, of one side of the metal plate of the host substrate device of FIG. 5d covered by the multilayer surface coating and, on the other hand, seen on the right, of the other side of said metal plate not covered by such a coating, during a phase of immersion of said metal plate, after one day, FIG. 5H shows the metal plate of the host substrate device of FIG. 5d after twenty-one days of immersion, with the portion of the host substrate (seen on the left) not covered by the multilayer surface coating comprising the fixing layer and the functional layer showing clear signs of corrosion while the portion (seen on the right) covered by said multilayer surface coating remains intact, indicating that corrosion has not taken place, FIG. 6A shows a host substrate formed by rough wooden boards, FIG. 6B shows the host substrate of FIG. 6a after application of the fixing layer and the functional layer, followed by the placing of electrodes, in contact with the functional layer, to electrically connect the boards together and form a heating element according to the present invention, FIG. 6C shows the application, in the heating element of FIG. 6b, with a brush, of the protective layer to the surface of the functional layer that is in contact with the electrodes, FIG. 6D shows the heating element of FIG. 6c with the protective layer, FIG. 6E shows the temperature at the surface of the heating element shown in FIG. 6d when no electric current flows through the electrodes connected to the functional layer containing the functional product, FIG. 6F shows the temperature at the surface of the heating element shown in FIG. 6d when a voltage of 20 V is applied between the electrodes with a non-zero current.

The present invention relates to a process for producing, applying and fixing a multilayer surface coating 2a, 3a to at least one surface to be coated 1a of a host substrate 1 in order to obtain a host substrate device.

Such a host substrate 1 may be produced or composed in whole or in part, but not exclusively, from all types of polymers (thermoplastics and thermosets), insulators or conductors, metals, alloys, oxides, wood, ceramics, glass, paper, textiles, silicon carbide, titanium, aluminum, zinc, Teflon, PMMA, PEEK, PLA, polypropylene microfibers known under the brand name Herculon, carbon/polymer composites, Kevlar, nylon or silicone.

Such a host substrate 1 may be in liquid or solid, flexible or rigid form. It may comprise liquids, for example, unpolymerized monomers and/or solids, for example, polymers, metals, wood, ceramics.

In accordance with the present invention, such a process consists in starting from, on the one hand, a fixing product 2, which may be in solid, liquid or gel form, and a functional product 3 having a liquid form and comprising monolayer or multilayer graphene dispersed in water or in a hydroalcoholic solution or in a solvent, the fixing product 2 being capable of being applied and fixed directly to the or each surface to be coated 1a, whether treated or untreated, of the host substrate 1 by surface interaction between said fixing product 2 and said surface to be coated 1a, said functional product 3 being capable of being applied and fixed directly to the fixing product 2 by surface interaction between said functional product 3 and said fixing product 2, to be applied successively:
  a layer of fixing product 2, called the fixing layer 2a, directly to the or each surface 1a to be coated, whether treated or untreated, of the host substrate 1 by covering the latter, the surface interaction between the latter achieving their fixing to each other,
  a layer, preferably thin, of functional product 3, called the functional layer 3a, directly to the fixing layer 2a by covering the latter, the surface interaction between the latter achieving their fixing to each other and thus the fixing or integral association of the functional layer 3a on the or each surface 1a to be coated of the host substrate 1 by means of the fixing layer 2a, said functional product 3 being applied to the fixing layer 2a by spraying, projection or spreading,
and optionally providing a drying period for the fixing layer 2a, before and/or after the application of the functional layer 3a, to promote the fixing of the fixing layer 2a to the or each surface 1a to be coated of the host substrate 1 and/or the fixing of the functional layer 3a to the fixing layer 2a.

The fixing layer 2a, containing the fixing product 2, has several roles or functions in the process that is the object of the present invention:
  it plays the role of the interface which ensures the adhesion of the functional layer 3a, containing the functional product 3, to the surface to be coated 1a of the host substrate 1. Indeed, in certain cases the nature of the host substrate 1, and thus of its surface to be coated 1a, does not allow a good adhesion of a functional product layer directly,
  in the case where the functional layer 3a is electrically conductive, it allows the functional layer 3a to be electrically isolated from the host substrate 1, in the case where the latter is electrically conductive. This makes it possible, when an electrical voltage is applied to the functional layer 3a alone, to heat the latter without the electrical current passing through the entire host substrate 1, thus avoiding electrical safety problems whatever the intended application.

It will be noted that the boundary between the fixing layer 2a and the functional layer 3a is not necessarily clear or well-defined, i.e., there may be interpenetration, over a certain thickness, of the two layers 2a and 3a.

Untreated surface to be coated 1a of the host substrate 1 means the natural or original surface to be coated 1a of the host substrate 1, i.e., before the application of the fixing layer 2a (containing fixing product 2), and treated surface to be coated 1a means the treated natural or original surface to be coated 1a of the host substrate 1, preferably mechanically or thermally or chemically, or to which one or more additional layers of a material or a composition of materials are applied in such a way as to enable direct fixing of the fixing product 2 to said surface to be coated 1a of the host substrate 1. It will then be understood that the surface to be coated 1a, whether treated or untreated, has fixing properties allowing, by surface interaction or under the action of a heat source, the fixing layer 2a to be fixed to the latter, but does not have fixing properties analogous to those of the fixing layer 2a of fixing product 2, which allows, for its part, by surface interaction, preferably either naturally or by a thermal action, the fixing of the functional product 3 to said surface to be coated 1a in order to form the functional layer 3a. The fixing layer 2a forms a fixing interface between the surface to be coated 1a and the functional layer 3a.

It will be understood that the functional layer 3a enables specific functionalities of the host substrate device according to the present invention to be provided, for example, as will be seen below, by forming a heating layer or a hydrophobic layer or a protective layer, for example against electromagnetic waves. Such a host substrate device may then enable the production of an element with such specific functionalities, for example, heating, anticorrosive, antifouling, anticlogging or hydrophobic, as will be described below in the examples of elements comprising such a host substrate device according to the present invention.

It will also be understood that the fixing layer 2a of fixing product 2 and/or the functional layer 3a of functional product 3 can be produced in one or more passes of said fixing or functional product according to the application and the desired performance.

Preferably, the process can provide for the application of the fixing layer 2a to the surface to be coated 1a of the substrate 1 once or several times and then, after a drying time of the surface of the layer which was deposited last depending on the nature of the fixing product, the deposition of the functional layer 3a is carried out. Depending on the expected properties of the element thus produced, the application of the functional product 3 to form the functional layer 3a can be repeated in order to obtain a homogeneous functional layer 3a that can meet the specifications in terms of expected performance.

A thin layer of functional product is understood to be a layer having a thickness preferably comprised between about 0.64 nm and 200 μm, preferably between 10 nm and 150 μm, and more preferentially between 1 μm and 100 μm.

The thickness of the functional layer 3a can be adapted according to the intended application and can be different on the same surface to be covered in order to provide the element with spatially selective electrical conduction or heating properties determined according to the intended application. For example, the layer 3 containing functional product can be deposited on the surface of the layer 2, containing fixing product, through a mask, in particular if it is desired to reveal at least a part of the host substrate, which makes it possible to produce a deposition layer of the layer 3 with specific patterns.

The amount of monolayer or multilayer graphene of the functional product 3 applied to the fixing layer 2a, i.e., on its outer surface, can be chosen to be less than about 10%, preferentially less than about 5%, more preferentially less than 3%, of the weight mass of said host substrate 1.

In a particular embodiment of the process, as can be seen in FIG. 2, the process may further consist, starting from a protective product 4 capable of being applied and fixed directly to the functional layer 3 by interaction between them, in applying a layer of said protective product 4, called the protective layer 4a, to the functional layer 3a, covering the latter, the interaction between the latter, either naturally or under the effect of a thermal action, achieving their fixing to each other. The protective layer 4a can be applied in one or more passes and can also be of a different nature depending on the intended application.

Thus, both of the above embodiments, with or without protective layer 4a, can be used depending on the application. The embodiment without protective layer 4a (FIG. 1) can be used in applications requiring accessibility of the effective functional layer 3a containing monolayer or multilayer graphene, for example in the fields of anticorrosion, antifouling or tribology. The embodiment with the protective layer 4a can be used in applications such as heating (de-icing/anti-icing, home heating, etc.), electromagnetic shielding and/or devices such as electronic circuits or sensors. These application examples are not limited in the context of the invention.

In certain application such as heating or defrosting, the protective layer 4a is used to protect the functional layer 3a containing the functional product 3 from moisture or mechanical shock in order to ensure good electrical safety for the element and for the user.

The protective layer 4a can also allow the origin of the element to be visualized by thermal measurement means in order to control fraud problems. It can also be used to protect the particular devices, patterns or architectures of the functional layer 3a in case the latter comprises such devices, patterns or architectures. Preferably, in the steps of applying the fixing layer 2a and/or the functional layer 3a, the process may consist in producing the thickness of the functional layer 3a and/or the fixing layer 2a so as to be substantially uniform or not.

The functional product 3 may comprise multilayer or monolayer graphene at a concentration greater than or equal to 0.2 g/l, preferably greater than or equal to 1 g/l, or even more preferably greater than or equal to 2 g/l and at least one surfactant. It will be understood that the concentration is that of the graphene in the functional product.

The fixing product 2 may comprise at least one of the products belonging to the following list: primers, resins, adhesive agents, composites, polymers, epoxy paint, silicon paint, water-based paint, oil-based paint, paint containing fillers for resisting high temperatures.

According to the process of the present invention, the fixing layer 2a, or the functional layer 3a or the protective layer 4a, can be applied in one or more passes and/or in different locations, by any means or process such as: spraying, projection, brushing, spreading, dip-coating, inkjet printing or rotogravure, silk-screen printing, lithography or flexography. The protective product 4 may comprise at least one of the products belonging to the following list: primers, resins, adhesive agents, polymers, composites, superhydrophobic coatings, flame retardant coatings such as polymeric primers, epoxy paints, silicon paints, water-based paints, oil-based paints, paints containing fillers for resistance to high temperatures, polyurethanes, high-temperature polyimides, polyesters, or a combination of at least two of said products.

Referring to FIGS. 3d, 3e, 4c and 4d, it can be seen that in a particular embodiment of the process, the process may consist, starting from an activation system that is suitable, i.e., in terms of its structural and functional characteristics and when it is put in the activation state, to cause, in interaction with the monolayer or multilayer graphene, an increase in the temperature of said functional layer 3a. The activation of the activation system can be performed automatically, for example by an electronic management and control system or by means of a manual control, which is not shown. It can also be carried out with different power sources in order to obtain an element with different temperature zones depending on the intended applications.

In this particular embodiment of the process, the process may consist in using the activation system comprising a power supply, not shown in the figures, and two electrodes 5 connected thereto, placing the electrodes 5 in contact with the functional layer 3a so as to be able to apply an electric voltage generating an electric current in the functional layer 3a having the effect of causing, in interaction with the monolayer or multilayer graphene(s), an increase in the temperature of said functional layer 3a. In this type of heating application, the fixing product 2 of the fixing layer 2a is selected so as to be able to withstand an increase in temperature of the functional layer 3a of functional product 3.

Furthermore, the functional layer 3a, once applied to the fixing layer 2a, can be thermally or chemically treated on the surface to obtain hydrophobic properties on the outer surface of the functional layer 3a. Such treatment means are known to the person skilled in the art such as for example: heating in a conventional oven, microwave, infrared, electromagnetic induction, doping or reaction with other chemicals, to mention only the best-known means. This treatment can be achieved by ensuring that the fixing layer 2a has the necessary thermal properties not to be degraded during said treatment. Such hydrophobic properties reduce the water or liquid trail condensed or deposited on the surface thus treated and thus protect the host substrate 1. Such an effect is difficult, if not impossible, to achieve with a product, for example a paint, containing monolayer or multilayer graphene embedded therein, due to the formation of porosity in the matrix of the monolayer or multilayer graphene and due to the fact that the exposed surface does not contain only monolayer or multilayer graphene acting as a hydrophobic product. Such a surface treatment of the functional layer 3a may be useful to reduce the adsorption of hydrophilic compounds, such as traces of water, present around a hydrocarbon or other feedstock or hydrate, thereby protecting the host substrate 1 by preventing the formation of hydrate nuclei, which over time leads to partial or complete clogging of the pipe (oil or gas), on the surface of the functional layer 3a and thus on the surface of the host substrate 1 covered by the latter forming part of the multilayer surface coating according to the invention.

The appended figures show a host substrate device, according to the present invention, obtainable by the process according to the present invention, said host substrate device comprising a host substrate 1 having at least one treated or untreated surface to be coated 1a.

In accordance with the present invention, such a device further comprises a multilayer surface coating 2a, 3a capable of being produced, applied and fixed to the or each surface 1a to be coated of the host substrate 1 according to the process of the present invention, said multilayer surface coating 2a, 3a comprising, as seen above, a superposition of a layer of fixing product 2, called the fixing layer 2a, applied and fixed to the or each surface 1a to be coated, and a layer of functional product 3, called the functional layer 3a, based on monolayer or multilayer graphene, i.e., based essentially on or comprising essentially or solely monolayer or multilayer graphene, applied and fixed to the fixing layer 2a.

In particular, it will be understood that following the application of the functional product, which is in liquid form at this stage of the application, the water or the hydroalcoholic solution or the solvent has evaporated naturally or more rapidly and forcibly, for example, by heating the functional product layer or the fixing product layer by thermal conduction of the latter, which has the effect of leaving, on the fixing layer, the functional product layer based essentially on, or comprising essentially or solely, monolayer or multilayer graphene. Thus, the layer of functional product 3 applied directly to the fixing layer 2a may be a homogeneous or quasi-homogeneous functional layer of graphene.

In a particular embodiment of the multilayer surface coating 2a, 3a, it may further comprise, as seen above according to the process, a layer of protective product 4, called the protective layer 4a, applied and fixed to the functional layer 3a by covering the latter. This protective layer 4a may have the function of electrically insulating the functional layer 3a when the latter is electrically conductive, with respect to the external environment, which makes it possible to reduce the dissipation of heat, during the heating of the functional layer 3a, to the external environment and thus to concentrate it towards the substrate 1 to be heated, or to introduce a colored decorative element into the system, and also for user safety. This protective layer 4a also makes it possible to mask certain particular patterns of the functional layer 3, which can be visualized, for example, by infrared camera, for the purpose of fraud controls for example.

Preferably, the amount of monolayer or multilayer graphene of the functional product 3 applied to the or each surface 1a to be coated of the host substrate 1 may be less than about 10%, preferentially less than about 5%, and more preferentially less than 3%, of the mass of said host substrate 1.

As can be seen in particular in FIGS. 3e, 3f, 4e, 4f and 5d, 5e, another object of the present invention is a heating element comprising a host substrate device according to the present invention.

The multilayer surface coating 2, 3 according to the present invention can be applied to any surface to be coated 1a of the host substrate 1 and allows an efficient use of graphene, monolayer and multilayer, for example, in fields such as electronics, optoelectronics (electronic circuits, phototransistors, etc.) but also in heating, electromagnetic shielding and security. These systems can also be used as hydrophobic devices to reduce the formation of water films or hydrate seeds in heat exchanger applications and in liquid or gas transport pipes, or as electrically conductive polymer-based devices to replace metallic compounds in certain applications. Heating related applications include home heating such as, for example, wall heating, floor heating, heating of furniture such as tables or chairs, de-icing/anti-icing and especially de-icing of aircraft wings, and sensors. These devices are also used to maintain the temperature of liquid or gas pipes in order to avoid the formation of solid seeds. Other applications, such as heating textiles, can also be considered.

In accordance with the present invention, such a heating element further comprises an activation system capable of causing, in interaction with the monolayer or multilayer graphene, an increase in the temperature of said functional layer 3a and thus of the heating element.

Advantageously, the device(s) produced according to the invention can have a very high heating rate to reach the set temperature level, comprised between 10 seconds and 1 hour, depending on the voltage applied. Moreover, the ratios of applied current to emitted energy, for the same type of substrate, can be comprised in a range from 50 W/m$^2$ to 5000 W/m$^2$ preferably between 500 W/m$^2$ and 4000 W/m$^2$, and more particularly between 1000 W/m$^2$ and 3000 W/m$^2$, depending on the output voltage applied and the weight of the monolayer or multilayer graphene load. Indeed, given the relatively small thickness of the fixing layer 2a and/or the functional layer 3a that will be applied later, and the very low mixing rate between them, the significant increase in temperature of the functional layer 3a should be able to be established quickly when a voltage is applied to the terminals.

Such a heating element according to the present invention is different from those of the prior art in that the application of the two layers, namely the fixing layer 2a and the functional layer 3a, can be carried out separately between a binder and an electrically conductive material to give a uniform covering layer on the surface to be coated 1a of the host substrate 1 and not as an intimate mixture as is the case in the prior art, for example, as disclosed in the above-mentioned document WO2014/091161.

In a preferential embodiment of the activation system, the latter may comprise two electrodes 5 connected to an electrical power supply, and said electrodes may be connected to the functional layer 3a so as to be able to apply an electrical voltage enabling an electrical current to be passed through the functional layer 3a having the effect of causing, in interaction with the monolayer or multilayer graphene, an increase in the temperature of said functional layer 3a and thus of the heating element. Other embodiments of the activation system can be envisaged such as, for example, a form where the activation system comprises an electromagnetic or infrared wave emitter or any wave (GSM, 3G, 4G, WIFI, etc.) whose wavelength is comprised between 0.5 and 5 GHz allowing, in interaction with the monolayer or multilayer graphene, such an increase in temperature.

The host substrate 1 of such a heating element may consist, for example, of a separating wall in a building such as a partition or a wall or other supports, of various sizes. Several example embodiments of such a heating element from host substrates 1 of various sizes and shapes such as a wooden board of rectangular shape and dimensions, for example, 20 cm (length)×12 cm (width), a plastic grating of square shape and dimensions, for example, 55 cm×55 cm, and a plastic tube of dimensions, for example, 12 cm (diameter)×55 cm (length), have made it possible to carry out tests demonstrating a significant increase in temperature.

In a first example concerning the production of the heating element according to the present invention, the host substrate 1 consists of a wooden board and the process consisted in carrying out the following steps of producing, applying and fixing a multilayer surface coating 2a, 3a to said host substrate 1, according to the present invention, not shown in the appended figures:

- the fixing layer 2a, for example produced with a paint-type fixing product 2, was applied to a surface to be coated 1a of the host substrate 1 using a brush,
- then, 5 minutes later, the functional product 3, such as a liquid solution comprising water and a concentration of 5 g/L of multilayer graphene, was sprayed on the upper surface of the fixing layer 2a forming the functional layer 3a which covers the latter. The operation can be performed several times in order to obtain a homogeneous and conductive graphene-based layer (functional layer 3a) on the surface of the fixing layer 2a. The amount of graphene deposited is less than 1% of the mass of the host substrate 1,
- then, the assembly obtained was subjected to a drying process at a temperature higher than the ambient temperature to promote the adhesion of the fixing layer 2a and the functional layer 3a to each other, on the one hand, and of the fixing layer 2a to the host substrate 1, on the other,
- then, after drying and bonding of the layers on the surface to be coated 1a of the host substrate 1, two copper electrodes 5 were deposited and brought into electrical contact with the functional layer 3a. The number of electrodes 5 may be greater than two depending on the shape of the resulting heating element and also depending on the voltages to be applied in said heating element,
- then the functional layer 3a was heated by passing a direct electric current when a voltage of 15 V was applied, resulting in an increase in temperature from 24.4° C. to 91.7° C. in 15 minutes. Such a heating element, due to the significant increase in temperature with a low applied voltage, showed a high electrothermal conversion efficiency.

In a second example concerning the production of the heating element, the host substrate 1 consists of a polymeric grating of dimensions 55 cm×55 cm, and the process consisted in carrying out the following steps of producing, applying and fixing a multilayer surface coating 2a, 3a to said host substrate 1, according to the present invention, as can be seen in FIGS. 3a, 3b, 3c, 3d:

- the white glycerol paint-type fixing product 2 was applied to the surface to be coated 1a of the host substrate 1 by spreading with a brush, which is not shown (FIG. 3a),
- then, 15 minutes later, the functional product 3, such as a liquid solution comprising water and a concentration of 5 g/L of multilayer graphene, was sprayed with a sputtering apparatus 6a onto the fixing layer 2a to form the functional layer 3a, the amount of graphene deposited being less than 1% of the mass of the host substrate 1 (FIG. 3b). The deposition area of the functional layer 3a can be seen in gray in FIG. 3b,
- then, the assembly obtained was subjected to a drying process using a drying apparatus 7 to promote adhesion of the functional layer 3a with the fixing layer 2a on the host substrate 1 (FIG. 3c),
- after drying the assembly, electrodes 5 were deposited on the surface of the functional layer 3a (FIG. 3d). The electrical resistance measured between the two terminals of the electrodes 5, using a multimeter, is relatively low, about 45 ohms as shown in the inset of FIG. 3d,
- then the functional layer 3a was heated by the passage of a direct electric current when a voltage of 15 V was applied, through the electrodes, which led to an increase in its temperature from 28.8° C. (ambient temperature measured during the experiment) (FIGS. 3e) to 44.6° C. in 10 minutes (FIG. 3f). Such a heating element, due to the significant increase in temperature with a low applied voltage, showed a high electrothermal conversion efficiency.

In a third example concerning the production of the heating element, the host substrate 1 may consist of a polymeric, for example PVC, tube and the process consisted in carrying out the following steps of producing, applying and fixing a multilayer surface coating 2a, 3a to said host substrate 1, according to the present invention, as can be seen in FIGS. 4a, 4b, 4c, 4e:

- the fixing product 2 of the primer type such as a white glycerol paint was applied on the outer surface of the tube with a brush 6b to form the fixing layer 2a (FIGS. 4a),
- 10 minutes later, the functional product 3 in the form of a liquid solution comprising water and a concentration of 2 g/l of multilayer graphene was sprayed with a sputtering apparatus 6a onto the fixing layer 2a to form the functional layer 3a, the amount of graphene deposited being less than 1% of the mass of the host substrate 1 (FIG. 4b). The operation was repeated four times to obtain a homogeneous functional layer 3a,
- then, the assembly obtained was subjected to a drying process, not shown in the figures, to promote the adhesion of the functional layer 3a to the fixing layer 2a but also of the fixing layer 2a to the host substrate 1,
- then, after drying, two copper electrodes 5 were deposited and brought into electrical contact with the functional layer 3a (FIG. 4c),
- the functional layer 3a was then heated by a direct electric current when a voltage of 10 V was applied, which led to an increase in its temperature from 22.6° C. (FIG. 4d) to 48.8° C. (FIG. 4e). This example showed a high electrothermal conversion efficiency with a temperature reaching 50° C. at a low voltage of 10 V (FIG. 5e). Such a heating element, due to the significant increase in temperature with a low applied voltage, showed a high electrothermal conversion efficiency.

In a fourth example concerning the production of the heating element, the host substrate 1 made of wood consists of wooden boards or panels for applications in the field of home heating, and the process consisted in carrying out the following steps of producing, applying and fixing a multilayer surface coating 2, 3, 4 to said substrate 1, according to the present invention, as can be seen in FIGS. 6a, 6b, 6c, 6d:

- the glycerol paint-type fixing product 2 was applied to the surface to be coated 1a of the host substrate 1 (FIG. 6a) by spreading with a brush which is not shown,
- then, 10 minutes later, the functional product 3, such as a liquid solution comprising water and a concentration of 5 g/L of multilayer graphene was sprayed with a spraying apparatus onto the fixing layer 2a in order to form the functional layer 3a of the functional product. The operation is repeated six times to deposit a functional layer with low electrical resistance. The amount of graphene deposited being less than 0.5% of the total weight of the host substrate 1,
- the assembly obtained was then subjected to a drying process using a drying apparatus to promote adhesion of the functional layer 3a to the fixing layer 2a on the one hand and the latter to the surface 1a to be coated of the host substrate on the other, after drying the element to obtain an integral multilayer structure, copper electrodes 5 were deposited and brought into electrical contact with the functional layer 3a (FIG. 6b), then, a protective layer 4a is applied to the surface of the functional layer 3a with a brush 6b (FIG. 6c), the boards are then assembled on a Plexiglas-based receiving plate 7 to form a structure similar to that of a heating structure (FIG. 6d), the set of electrodes 5 in contact with the functional layer 3a is connected to the electrical circuit, the functional layer 3a was then heated by passing a direct electric current when a voltage of 15 V was applied across the electrodes 5, causing its temperature to rise from 24.7° C. (FIGS. 6e) to 72.9° C. (FIG. 6f) in 20 minutes. Such a heating element, due to the significant increase in temperature with a low applied voltage, showed a high electrothermal conversion efficiency (FIG. 6f).

The preceding examples of embodiments of a heating element according to the present invention demonstrate the feasibility of such a heating element, particularly with respect to the functional layer, based on monolayer and multilayer graphene, on various types of surfaces.

The multilayer surface coating 2a, 3a, 4a according to the present invention can be applied on any host substrate 1 surface and allows an efficient use of graphene, in electronics, optoelectronics (electronic circuits, phototransistors, etc.) but also in new fields such as heating, electromagnetics, shielding and security. Among the applications related to heating, mention may be made of home heating such as, for example, wall heating, floor heating, heating of furniture such as tables or chairs, de-icing/anti-icing and in particular the de-icing of aircraft wings, and sensors. Other applications, such as textile heating, can also be considered.

Referring to FIG. 4, it can be seen that the present invention also has as its object an anticorrosion element comprising a host substrate device according to the present invention.

In accordance with the present invention, in such an anticorrosion element, the functional product 3 is produced from monolayer or multilayer graphene, which naturally has anticorrosion properties, the surface to be coated 1a of the host substrate 1 then being at least partly metallic. The surface to be coated 1a of the host substrate 1 can then be immersed, in particular in a liquid or gaseous medium.

An example concerning the production of such an anticorrosion element with the host substrate 1 consisting of a metal plate of rectangular shape and dimensions 12×20 cm, consisted in carrying out the following steps of producing, applying and fixing a multilayer surface coating 2a, 3a to said host substrate 1, according to the present invention, as can be seen in FIGS. 5a, 5b, 5c, 5d, 5e, 5f:

the fixing product 2 was applied to one side of the host substrate 1 on the metallic surface to be coated 1a, with a brush 6b, in order to form the fixing layer 2a (FIG. 5a and FIGS. 5b), 15 minutes later, the functional product 3 in the form of a liquid solution comprising a concentration of 5 g/l of graphene was sprayed by a sputtering apparatus 6a only or essentially on the fixing layer 2a previously in order to form the functional layer 3a, the amount of graphene deposited is less than 0.5% of the mass of the host substrate 1 (FIG. 5c), then, the assembly obtained was subjected to a drying process at 80° C. to promote adhesion of the functional layer 3a to the fixing layer 2a and of the fixing layer 2a to the surface to be coated 1a of the substrate 1 (FIG. 5d), then, after drying and bonding of the graphene carbon to the fixing layer 2a, the host substrate 1, with only one side or face coated with the graphene-based multilayer surface coating 2a, 3a (FIG. 5e), was placed in a vessel 8 equipped with a continuous water flow 8a (FIG. 5f). After 21 days of water flow (FIG. 5h), a deterioration of the uncoated part of multilayer surface coating and a high corrosion resistance of the coated side of the latter could be clearly observed, demonstrating the good performance of such an anticorrosion element. Such an anticorrosion element, which can also be used as an anticlogging or antifouling element, can be used to prevent the deposition of fouling on the host substrate 1, for example by preventing the growth of algae on host substrates 1 such as ship hulls or oil pipes or to prevent or slow down the formation of hydrates inside gas or oil pipes, and in the field of tribology to improve the frictional properties between solids and solids (for example: gears between metals in the field of watch mechanics, cars, industrial pilots), between solids and air (for example friction of helicopter blades with air) or between solids and liquids (for example between oil and the walls of the pipes carrying it).

A heating element according to the present invention can be used as a de-icing element for metal structures. The presence of the fixing layer 2a allows the functional product 3 of the functional layer 3a to be electrically insulated from the metal structure of the substrate 1. Upon application of a voltage between the electrodes in contact with the functional layer 3a, the temperature of the latter will increase without any loss of current in the host substrate 1. This increase in temperature in the functional layer 3a can reduce problems with ice formation on the structure.

Another object of the present invention is a hydrophobic element comprising a host substrate device according to the present invention. In such an element, the functional layer 3a has surface hydrophobic properties. This hydrophobic property can be generated either by heat-treating the element or by specifically treating the surface of the functional layer 3a by chemical treatments, for example functionalization with hydrophobic substances.

The hydrophobicity can be improved by subjecting the hydrophobic element, after synthesis, to suitable thermal or chemical treatments, depending on the nature of the substrate used.

The present invention may also provide for other elements comprising a host substrate device according to the present invention having particular properties, in particular surface properties, for example particular tribological properties.

Of course, the invention is not limited to the embodiments described and represented in the appended drawings. Modifications remain possible, in particular from the point of view of the constitution of the various elements or by substitution of technical equivalents, without however leaving the scope of protection of the invention.

What is claimed is:

1. A process for producing, applying and fixing a multilayer surface coating to a surface to be coated, the process comprising applying successively:

a layer of fixing product, called the fixing layer, directly to the surface to be coated of the host substrate by covering the surface to be coated, the surface interaction between the fixing layer and the surface to be coated achieving a fixing to each other, and a layer of functional product, called the functional layer, directly onto the fixing layer by depositing on the fixing layer, the surface interaction between the fixing layer and the functional layer effecting a fixing to each other and thus a fixing of the functional layer to the surface to be coated of the host substrate by means of the fixing layer, said functional product being applied to the fixing layer by spraying, projecting or spreading, the process further comprising providing a drying period for stabilizing the fixing layer, before and/or after the application of the functional layer, to promote the fixing of the fixing layer to the surface to be coated of the host substrate and/or the fixing of the functional layer to the fixing layer;

wherein said functional product is in a liquid suspension form and comprises monolayer or multilayer graphene at a concentration greater than or equal to 0.2 g/L and at least one surfactant dispersed in water or in a hydroalcoholic solution or in a solvent;

wherein said fixing product is capable of being applied and fixed directly to the surface to be coated of the host substrate by surface interaction between said fixing product and said surface to be coated; and wherein said functional product is capable of being applied and fixed directly to the fixing product by surface interaction between said functional product and said fixing product.

2. The process as claimed in claim 1, wherein an amount of monolayer or multilayer graphene of the functional product applied to the fixing layer is chosen to be less than about 10% of a mass of said host substrate.

3. The process as claimed in claim 1, further comprising, applying a protective layer, to the functional layer by covering the functional layer, naturally or under the effect of a thermal action, the interaction between the functional layer and the protective layer effecting a fixing to each other.

4. The process as claimed in claim 3, wherein the protective product comprises at least one of: primers, resins, adhesive agents, polymers, composites, superhydrophobic coatings, fireproof coatings comprising polymeric primers, epoxy paints, silicon paints, water-based paints, oil-based paints, paints containing fillers for resisting high temperatures, polyurethanes, high-temperature polyimides, and polyesters.

5. The process as claimed in claim 3, wherein the fixing layer or the functional layer or the protective layer is applied by at least one of: spraying, projection, brushing, spreading, dip-coating, inkjet printing, rotogravure, screen printing, lithography, and flexography.

6. The process as claimed in claim 1, further comprising achieving a substantially uniform or non-uniform thickness of the functional layer and/or of the fixing layer.

7. The process as claimed in claim 1, wherein the fixing product comprises at least one of: primers, resins, adhesive agents, composites, polymers, epoxy paints, water-based paints, oil-based paints, and or paints containing fillers for resisting high temperatures.

8. The process as claimed in claim 1, further comprising, an activation system causing, in interaction with the monolayer or multilayer graphene, an increase in temperature of said functional layer.

9. The process as claimed in claim 8, wherein the activation system comprises an electrical power supply and two electrodes connected to the electrical power supply, the process further comprising placing the electrodes by bringing them into contact with the functional layer so as to be able to apply an electrical voltage to cause an electrical current to pass through the functional layer causing, in interaction with the monolayer or multilayer graphene, an increase in temperature of said functional layer.

10. The process as claimed in claim 1, wherein the functional layer, once applied to the fixing layer, is thermally or chemically treated on the surface to obtain hydrophobic properties.

11. A host substrate device obtained by the process as claimed in claim 1, said host substrate device comprising:
a host substrate having at least one surface or one defined area to be coated;
a multilayer surface coating produced, applied and fixed to the surface to be coated according to the process,
said multilayer surface coating comprising a superposition of a layer of fixing product, called the fixing layer, applied and fixed directly to the surface to be coated and a layer of functional product, called the functional layer, based on monolayer or multilayer graphene, applied and fixed directly to the fixing layer.

12. The host substrate device as claimed in claim 11, wherein the multilayer surface coating further comprises a layer of protective material, called the protective layer, which is applied and fixed to the functional layer by surface interaction, covering the functional layer.

13. The host substrate device as claimed in claim 11, wherein an amount of monolayer or multilayer graphene of the functional product applied to the surface to be coated of the host substrate is less than about 10% of a mass of said host substrate.

14. A heating element comprising a host substrate device as claimed in claim 11, comprising an activation system to cause, in interaction with the monolayer or multilayer graphene, an increase in temperature of said functional layer and of the heating element.

15. The heating element as claimed in claim 14, wherein the activation system comprises two electrodes connected to a power supply wherein said electrodes are connected to the functional layer so as to be able to apply an electric voltage enabling an electric current to be generated in the functional layer causing, in interaction with the monolayer or multilayer graphene, an increase in temperature of said functional layer and of the heating element.

16. An anticorrosion element comprising a host substrate device as claimed in claim 11, wherein the functional product is made from monolayer or multilayer graphene, exhibiting anticorrosion properties, wherein the surface to be coated of the host substrate is at least partly metallic.

17. A hydrophobic element comprising a host substrate device as claimed in claim 11, wherein the functional layer has hydrophobic properties on the surface and is heat-treated or chemically treated on the surface to obtain said hydrophobic properties on the outer surface of said functional layer.

* * * * *